May 22, 1934.    P. ROBINSON    1,959,966
NONINFLAMMABLE WOODEN BUILDING PRODUCT AND METHOD OF MAKING THE SAME
Filed July 15, 1930
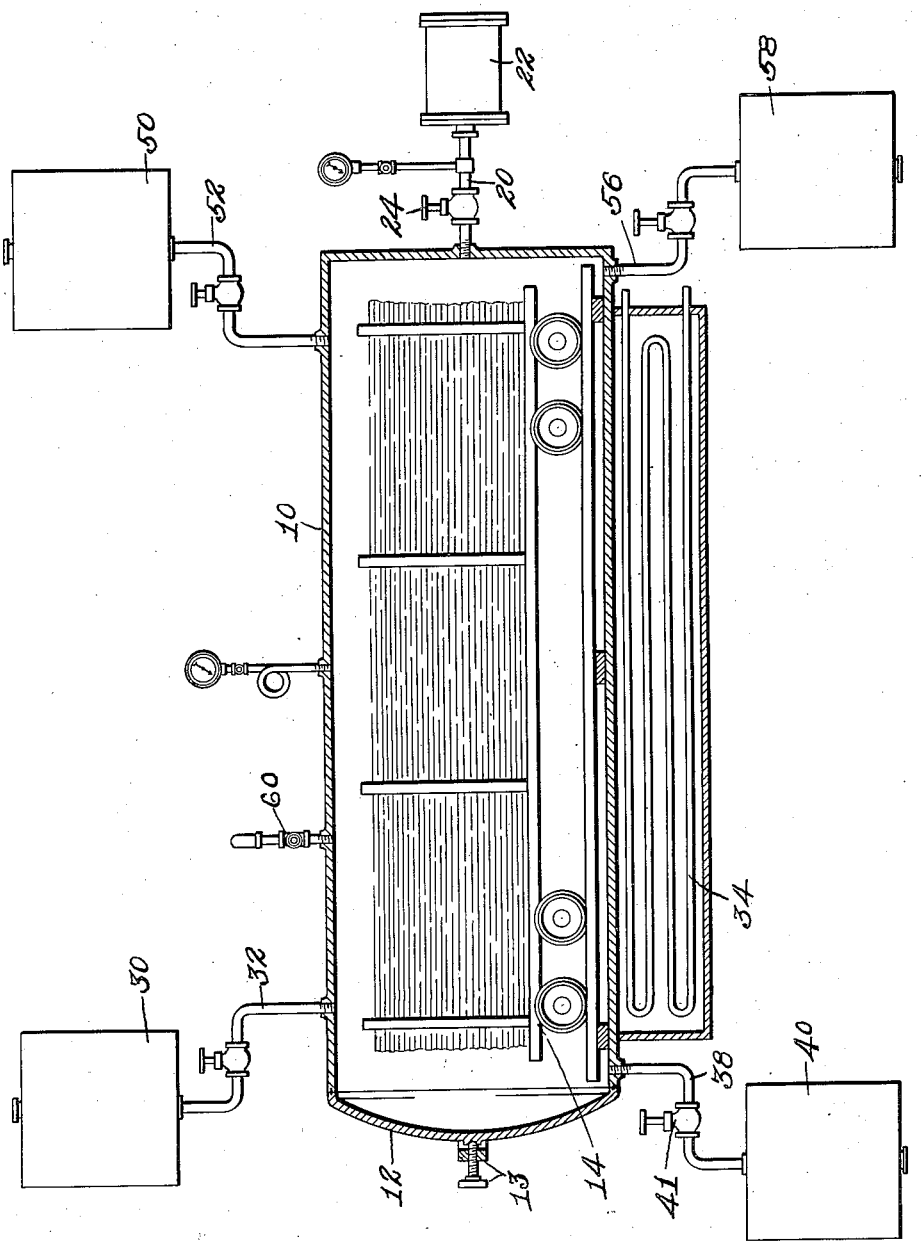
INVENTOR.
Paul Robinson
BY J. Stanley Churchill
ATTY.

Patented May 22, 1934

1,959,966

UNITED STATES PATENT OFFICE 1,959,966

NONINFLAMMABLE WOODEN BUILDING PRODUCT AND METHOD OF MAKING THE SAME

Paul Robinson, Boston, Mass.

Application July 15, 1930, Serial No. 468,070

3 Claims. (Cl. 99—12)

This invention relates to non-inflammable wooden building products and to methods of making the same.

Various attempts have heretofore been made to treat wood with fire resisting chemicals in order to produce non-inflammable wooden products suitable for building purposes. Notwithstanding the industrial need for such products, as far as I am aware, none of such attempts have proved commercially successful.

One object of the present invention is to produce novel non-inflammable wooden building products and more particularly to non-inflammable wooden shingles which may be manufactured within such manufacturing costs as will enable them to be commercially manufactured and sold in competition with the various building products now upon the market, and which possess a degree of fire-resistance such as to render them available for many building purposes for which the ordinary inflammable wooden products are now unsuitable.

Another object of the invention is to provide a novel, non-inflammable wooden shingle having a characteristic gray weathered appearance, which together with the non-inflammability of the shingle imparts to the same increased commercial value.

A further object of the invention is to provide a novel process for the production of the improved non-inflammable wooden building products, and a still further object of the invention is to provide a novel process for producing a non-inflammable wooden shingle having the characteristic gray weathered appearance above referred to, both of said processes being adapted to enable the products to be produced in a sufficiently economical manner to render the processes commercial.

With these objects in view and such others as may hereinafter appear, the invention consists in the non-inflammable wooden building products and in the processes of producing the same hereinafter described and particularly defined in the claims at the end of this specification.

In the drawing I have illustrated more or less diagrammatically the preferred form of apparatus which may be used in practicing the present process.

Viewed in its broader aspects, the invention contemplates the provision of wooden building products of a non-inflammable nature which may be used with advantage for all of the purposes for which the present wooden building products are employed, and in addition which possess a degree of non-inflammability such as to increase the utility of these products as compared with corresponding inflammable wooden building products.

In its more specific aspects, the invention contemplates the provision of a non-inflammable wooden shingle having a characteristic gray weathered appearance closely approaching that produced when an ordinary shingle is exposed to the weather for a number of years. Wooden shingles of this appearance are sought in many instances by those desiring the production of houses of most attractive appearance, and heretofore, as far as I am aware, this appearance in a wooden shingle has only been secured by exposing the shingles to the weather.

In accordance with the preferred process, such a non-inflammable shingle having the characteristic gray weathered appearance may be commercially produced at an exceedingly small manufacturing cost over the cost of the ordinary untreated wooden shingle by treatment of a red cedar shingle either in detached or bundle form with first a solution of sodium silicate, and then immediately thereafter with a solution of ammonium sulphate, whereby an insoluble precipitate is formed within the interstices of the wood. In order to obtain most efficient impregnation, I prefer to first subject the red cedar shingles to a vacuum treatment within a retort and to follow with successive impregnations with sodium silicate and ammonium sulphate solutions. For purposes of illustration the preferred process for the production of the improved non-inflammable wooden building products will be hereinafter described in detail in connection with the production of the novel gray non-inflammable shingles from red cedar shingles.

Referring now to the drawing, which as above stated illustrates the preferred form of apparatus which may be used for the production of the present shingles, 10 represents a retort of any usual or preferred construction and which is preferably provided with a removable end 12 normally held in a position to close the end of the retort by a clamp 13. When the end 12 is removed, a truck 14 carrying the wooden building products to be treated, and specifically a truck carrying the red cedar shingles either in bunch or detached form, may be run into the retort and then the cover replaced to provide a gas-tight joint. The retort 10 is connected by a pipe 20 to a vacuum pump 22 of any usual or preferred construction, and in the operation of the process the first step preferably comprises the subjection of the shingles to vacuum, and after the vacuum pump 22 has been permitted to operate for a substantial length of time, as for example one hour, then a valve 24 may be closed, cutting off the retort from the vacuum pump. The exact length of time that it may be desirable in the operation of the process to continue the vacuum treatment will depend upon the condition of the shingles themselves and the strength of the vacuum, and in any event it is desirable to continue the treatment until the moisture content of the shingles has been reduced to a minimum as well as most of the air occluded within the interstices of the shingles.

After the shingles within the retort have been subjected to the vacuum treatment, they are then impregnated with a solution of sodium silicate, and for this purpose a saturated solution of sodium silicate may be run into the retort 10 from a supply tank 30 which is preferably elevated above the retort 10 so that the solution may run by gravity into the retort through the pipe line 32. The vacuum within the retort assists in drawing in the solution and in causing the solution to thoroughly impregnate the shingles even though the latter be in bunch form. Sufficient silicate of soda solution is preferably introduced into the retort to submerge the shingles. It is preferred to utilize such solution in a hot condition and the solution may be heated within the supply tank 30 or by heating coils 34 within the retort, or by both, and desirable results have been secured by the maintenance of the silicate of soda solution at a temperature of substantially 185° F. during the impregnation. The impregnation of the shingles with the silicate of soda solution may be continued with advantage for a period of substantially one hour after which the solution may be permitted to run from the retort through the pipe line 38 and into a storage tank 40, a valve 41 being provided to control the flow through the pipe line. If found desirable a pump, not shown, may be used to assist in withdrawing the solution from the retort. In practice I have experienced good results using a silicate of soda solution having a gravity of substantially 10° Bé. which comprises practically a saturated solution.

Immediately after the silicate of soda solution has been thus withdrawn from the retort, a hot solution of commercial ammonium sulphate is introduced from a supply tank 50 through a pipe line 52, and sufficient of the ammonium sulphate solution is introduced to submerge the shingles therein. The ammonium sulphate solution is also preferably maintained by means of the heating coils 34 to a temperature of at least 185° F., and the shingles permitted to remain in such solution for a period of approximately an hour. After the impregnation with ammonium sulphate has been completed such solution is then withdrawn from the retort by being permitted to flow by gravity through the pipe line 56 into a storage tank 58, or if found desirable may be pumped out of the retort by any suitable commercial form of pump (not shown). A vent valve 60 is preferably opened when such solution is withdrawn. After the shingles have thus been treated, they may be permitted to dry or they may be used immediately if desired.

The foregoing treatment first with the alkaline sodium silicate solution and then with the slightly acidic solution of commercial ammonium sulphate, produces an insoluble precipitate, which is probably silicic acid, dispersed through the interstices of the shingles, and which together with the crystals of such sodium silicate and ammonium sulphate as may remain upon the fibres throughout the shingles when the latter become dry, serves to render the shingles non-inflammable. The sodium silicate and commercial ammonium sulphate are relatively inexpensive and the process itself is simple, thus enabling the non-inflammable shingles to be produced at a relatively small manufacturing cost and enabling them to be used commercially instead of the untreated inflammable wooden shingles.

In the operation of the present process, the alkaline sodium silicate solution removes the color from the red cedar shingles, imparting a gray appearance thereto, and after the treatment of the shingles with the ammonium sulphate solution, there is imparted to the shingles a silvery sheen characteristic of weathered shingles. By the use of the present shingles, dwelling houses may have imparted to them a most pleasing and desirable appearance. This advantageous feature of the present shingle, together with its non-inflammability, imparts to the product commercial utility and value, and its method of manufacture is such as to enable the product to be produced commercially with profit to the manufacturer.

While the present process has been described in detail in connection with the production of non-inflammable shingles from red cedar shingles, it will be understood that the invention in its broader aspects includes various other non-inflammable wooden building products and processes for their production.

Having thus described the invention, what is claimed is:—

1. The method of making an artificially weathered and fire-resisting shingle having the characteristic gray weathered appearance of a naturally weathered shingle, which consists in subjecting a red cedar shingle to impregnation with a sodium silicate solution for a sufficient length of time to change the color of the shingle to a characteristic weathered gray, and thereafter subjecting the shingle to impregnation with a solution of ammonium sulphate to effect the precipitation of an insoluble reaction product throughout the interstices of the shingle.

2. The method of making an artificially weathered wooden building product having the characteristic gray weathered appearance of a naturally weathered wooden building product, which consists in subjecting a red cedar building product to impregnation with a sodium silicate solution for a sufficient length of time to change the color of the building product to a characteristic weathered gray, and thereafter subjecting the building product to impregnation with a solution of ammonium sulphate to effect the precipitation of an insoluble reaction product throughout the interstices of the building product.

3. As a new article of manufacture, an artificial weathered and fire resisting wooden building product having the characteristic gray weathered appearance of a naturally weathered shingle and comprising a red cedar building product having dispersed throughout the interstices thereof the reaction product of a solution of silicate of soda and ammonium sulphate.

PAUL ROBINSON.